(12) United States Patent
Yang et al.

(10) Patent No.: US 12,348,970 B2
(45) Date of Patent: Jul. 1, 2025

(54) NFC TAG VERIFICATION METHOD AND RELATED DEVICE

(71) Applicant: HUAWEI TECHNOLOGIES CO., LTD., Shenzhen (CN)

(72) Inventors: Zhuoqing Yang, Shenzhen (CN); Hao Wang, Shenzhen (CN); Feng Li, Shenzhen (CN); Liangliang Luo, Shenzhen (CN); Zhiyong Yan, Shenzhen (CN); Zhuorui Liu, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 223 days.

(21) Appl. No.: 18/255,053

(22) PCT Filed: Nov. 29, 2021

(86) PCT No.: PCT/CN2021/134037
§ 371 (c)(1),
(2) Date: May 30, 2023

(87) PCT Pub. No.: WO2022/111691
PCT Pub. Date: Jun. 2, 2022

(65) Prior Publication Data
US 2024/0022911 A1    Jan. 18, 2024

(30) Foreign Application Priority Data

Nov. 30, 2020  (CN) .......................... 202011384278.5

(51) Int. Cl.
*H04W 12/47* (2021.01)
*H04W 4/80* (2018.01)
(52) U.S. Cl.
CPC ............. *H04W 12/47* (2021.01); *H04W 4/80* (2018.02)

(58) Field of Classification Search
CPC ................................ H04W 12/47; H04W 4/80
See application file for complete search history.

(56) References Cited

U.S. PATENT DOCUMENTS

| 9,100,426 B1 | 8/2015 | Fang |
| 2015/0134552 A1* | 5/2015 | Engels ................. G06Q 10/087 705/318 |

(Continued)

FOREIGN PATENT DOCUMENTS

| CN | 103383736 A | 11/2013 |
| CN | 103927502 A | 7/2014 |

(Continued)

*Primary Examiner* — Jonathan A Bui
(74) *Attorney, Agent, or Firm* — Leydig, Voit & Mayer, Ltd.

(57) ABSTRACT

An NFC tag verification method is provided. The method is applied to a first electronic device, and includes: detecting NFC tag information of a second electronic device; performing verification on the NFC tag information based on a locally stored first verification list, to obtain a first verification result; if the first verification result is that the verification succeeds, starting to run an application service associated with the NFC tag information; sending the NFC tag information to a cloud server; receiving a second verification result obtained by the cloud server by performing verification on the NFC tag information; and if the second verification result is that the verification fails, stopping running the application service. In the solution of embodiments of this application, when verification is performed on an NFC tag, the application service is first started to run after local verification succeeds, and then cloud verification is performed.

20 Claims, 5 Drawing Sheets

(56) References Cited

U.S. PATENT DOCUMENTS

| | | | |
|---|---|---|---|
| 2016/0180312 A1* | 6/2016 | Salihi | H04W 4/24 |
| | | | 705/17 |
| 2016/0182713 A1* | 6/2016 | Salihi | H04M 17/301 |
| | | | 455/414.1 |
| 2019/0278964 A1 | 9/2019 | Tsai et al. | |
| 2021/0304771 A1* | 9/2021 | Lin | G10L 15/222 |
| 2023/0354020 A1* | 11/2023 | Rule | H04L 9/3213 |

FOREIGN PATENT DOCUMENTS

| | | |
|---|---|---|
| CN | 104281876 A | 1/2015 |
| CN | 105187368 A | 12/2015 |
| CN | 110046881 A | 7/2019 |

* cited by examiner

NFC TAG VERIFICATION METHOD AND RELATED DEVICE

CROSS-REFERENCE TO RELATED APPLICATIONS

This application is a National Stage of International Application No. PCT/CN2021/134037, filed on Nov. 29, 2021, which claims priority to Chinese Patent Application No. 202011384278.5, filed on Nov. 30, 2020, both of which are hereby incorporated by reference in their entireties.

TECHNICAL FIELD

This application relates to the field of electronic technologies, and in particular, to a near field communication (NFC) tag verification method and a related device.

BACKGROUND

An NFC technology that has characteristics such as security, fastness and anti-interference is widely applied to various electronic devices. Based on the NFC technology, a communication distance between devices is usually less than 10 centimeters, and time for establishing a connection may be less than 0.1 seconds, to avoid signal interference of another device.

With reference to the foregoing characteristics, the NFC technology may be applied to various near field service scenarios. For example, in a OneHop scenario, a mobile phone may be used to touch an NFC tag of another device. An NFC module in the mobile phone reads NFC tag information in a process of touching the NFC tag of the another device. The mobile phone may start a related application based on the NFC tag information, to implement linkage with the another device. For example, by touching an NFC tag of another device, OneHop Projection, OneHop Audio Sharing, OneHop Watch Faces, OneHop Network Connection, OneHop Video Connection, and OneHop Printing may be implemented.

Although the application can be started based on the NFC technology, in actual services, the NFC tag information may expire or be tampered with. Consequently, the application is started by mistake. Therefore, when the application is started by using the NFC tag information, how to perform verification on the NFC tag information becomes a problem that needs to be resolved.

SUMMARY

Embodiments of this application provide an NFC tag verification method and a related device. An application service is first started to run after local verification succeeds, and then cloud verification is performed. In this way, starting of the application service can be accelerated.

According to a first aspect, an embodiment of this application provides an NFC tag verification method. The method is applied to a first electronic device, and includes: detecting NFC tag information of a second electronic device; performing verification on the NFC tag information based on a locally stored first verification list, to obtain a first verification result; if the first verification result is that the verification succeeds, starting to run an application service associated with the NFC tag information; if the first verification result is that the verification fails, skipping starting the application service associated with the NFC tag information; then sending the NFC tag information to a cloud server regardless of whether the first verification result is that the verification succeeds or the verification fails, to enable the cloud server to perform verification on the NFC tag information; receiving a second verification result obtained by the cloud server by performing verification on the NFC tag information; if the first verification result is that the verification succeeds and the corresponding application service is started, continuing to run the corresponding application service when the second verification result is that the verification succeeds; and if the first verification result is that the verification succeeds and the corresponding application service is started, stopping running the application service when the second verification result is that the verification fails. It can be learned that, in the solution of this embodiment of this application, the application service is first started to run after local verification succeeds, and then cloud verification is performed. In this way, starting of the application service can be accelerated. In addition, in the solution of this embodiment of this application, local and cloud collaborative verification can ensure accuracy of a verification result.

With reference to the first aspect, in some implementations of the first aspect, a manner in which the first electronic device obtains the NFC tag information of the second electronic device may include: in response to an operation of approaching or touching an NFC tag of the second electronic device, reading the NFC tag information stored in the NFC tag.

With reference to the first aspect, in some implementations of the first aspect, that the first electronic device performs verification on the NFC tag information based on the locally stored first verification list, to obtain the first verification result includes: The first electronic device locally stores the first verification list. The first electronic device determines, based on the NFC tag information, whether the first verification list includes first verification information for performing verification on the obtained NFC tag information. If the first verification list includes the first verification information, the first electronic device performs verification on the NFC tag based on the first verification information, to obtain the first verification result.

With reference to the first aspect, in some implementations of the first aspect, the method further includes: If the first verification list does not include the first verification information, it may be determined that the first verification result is that the verification fails. When the first verification result is that the verification fails, the first electronic device skips starting the application service corresponding to the NFC tag information, and sends the NFC tag information to the cloud server, to enable the cloud server to perform verification on the NFC tag information.

With reference to the first aspect, in some implementations of the first aspect, the method further includes: If the first verification list includes the first verification information and the verification on the NFC tag information based on the first verification information fails, determining that the first verification result is that the verification fails. Similarly, when the verification on the NFC tag information based on the first verification information fails, the first electronic device skips starting the application service corresponding to the NFC tag information, and sends the NFC tag information to the cloud server, to enable the cloud server to perform verification on the NFC tag information.

With reference to the first aspect, in some implementations of the first aspect, the method further includes: if the first verification result is that the verification fails, skipping starting the application service associated with the NFC tag information. When the NFC tag information is sent to the cloud server and the second verification result obtained from the cloud server is that the verification succeeds, the first electronic device starts the application service associated with the NFC tag information.

With reference to the first aspect, in some implementations of the first aspect, when the first electronic device needs to send the NFC tag information to the cloud server, if the first electronic device determines that a connection to the cloud server fails, the first electronic device sends a first message to a third electronic device in a near field communication manner. The first message includes the NFC tag information, and the third electronic device is a device that establishes a connection to the cloud server. Optionally, that the first electronic device fails to connect to the cloud server may be that the first electronic device fails to connect to the cloud server in an internet manner. The foregoing near field communication manner may be an NFC communication manner, a Bluetooth communication manner, or another possible near field communication manner. In other words, when the first electronic device fails to connect to the cloud server in the internet manner, the first electronic device sends the NFC tag information to the third electronic device in the near field communication manner, so that the third electronic device uploads the NFC tag information to the cloud server. The third electronic device further obtains the second verification result from the cloud server. The third electronic device then sends the second verification result to the first electronic device in the near field communication manner. In other words, the first electronic device may implement cloud verification with assistance of the third electronic device.

With reference to the first aspect, in some implementations of the first aspect, before the sending a first message to a third electronic device in a near field communication manner, the method further includes: determining a trusted device set, where the trusted device set includes a plurality of electronic devices that each establish a connection to the cloud server; sending, to each of the electronic devices in the trusted device set, a second message for requesting to obtain resource occupation information; receiving a third message sent by each of the electronic devices based on the second message, where the third message includes the resource occupation information; and determining the third electronic device from the electronic devices based on the received resource occupation information of each of the electronic devices. Optionally, the first electronic device may prestore the trusted device set. For example, the first electronic device may determine electronic devices under a same user account as the trusted device set. In some embodiments, the first electronic device may alternatively obtain the trusted device set in a search manner. For example, the first electronic device searches for a Bluetooth device, and determines the trusted device set based on a search result. Certainly, a manner in which the first electronic device obtains the trusted device set may alternatively be another possible implementation. Details are not listed herein one by one.

With reference to the first aspect, in some implementations of the first aspect, the method further includes: receiving a second verification list sent by the cloud server, where the second verification list includes verification information for performing verification on each piece of NFC tag information; and updating the first verification list based on the second verification list. In this embodiment of this application, the cloud server maintains a verification list for performing verification on each piece of NFC tag information.

When the verification list maintained by the cloud server is updated or when the first electronic device requests, the cloud server sends the second verification list to the first electronic device. Optionally, the second verification list is a latest-version verification list that is maintained by the cloud server and that is used for performing verification on each piece of NFC tag information.

According to a second aspect, an embodiment of this application provides an electronic device. The electronic device serves as a first electronic device and includes:

one or more processors, a memory, and one or more computer programs, where the one or more computer programs are stored in the memory, and the one or more computer programs include instructions; and when the instructions are executed by the electronic device, the electronic device is enabled to perform the following steps: detecting NFC tag information of a second electronic device; performing verification on the NFC tag information based on a locally stored first verification list, to obtain a first verification result; if the first verification result is that the verification succeeds, starting to run an application service associated with the NFC tag information; sending the NFC tag information to a cloud server; receiving a second verification result obtained by the cloud server by performing verification on the NFC tag information; and if the second verification result is that the verification fails, stopping running the application service.

With reference to the second aspect, in some implementations of the second aspect, when the instructions are executed by the device, the device is enabled to specifically perform the following step: in response to an operation of approaching or touching an NFC tag of the second electronic device, reading the NFC tag information stored in the NFC tag.

With reference to the second aspect, in some implementations of the second aspect, when the instructions are executed by the device, the device is enabled to specifically perform the following steps: determining, based on the NFC tag information, whether the first verification list includes first verification information for performing verification on the NFC tag information. If the first verification list includes the first verification information, performing verification on the NFC tag based on the first verification information, to obtain the first verification result.

With reference to the second aspect, in some implementations of the second aspect, when the instructions are executed by the device, the device is enabled to specifically perform the following step: if the first verification list does not include the first verification information, determining that the first verification result is that the verification fails.

With reference to the second aspect, in some implementations of the second aspect, when the instructions are executed by the device, the device is enabled to specifically perform the following step: if the first verification list includes the first verification information and the verification on the NFC tag information based on the first verification information fails, determining that the first verification result is that the verification fails.

With reference to the second aspect, in some implementations of the second aspect, when the instructions are executed by the device, the device is enabled to specifically perform the following steps: if the first verification result is that the verification fails, skipping starting the application service associated with the NFC tag information; and when the NFC tag information is sent to the cloud server and the second verification result obtained from the cloud server is that the verification succeeds, starting the application service associated with the NFC tag information.

With reference to the second aspect, in some implementations of the second aspect, when it is determined that a connection to the cloud server fails, a first message is sent to a third electronic device in a near field communication manner, where the first message includes the NFC tag information, and the third electronic device is a device that establishes a connection to the cloud server; and the second verification result sent by the third electronic device is received, where the third electronic device is configured to send the NFC tag information to the cloud server, and obtain the second verification result from the cloud server.

With reference to the second aspect, in some implementations of the second aspect, when the instructions are executed by the device, the device is enabled to specifically perform the following steps: determining a trusted device set, where the trusted device set includes a plurality of electronic devices that each establish a connection to the cloud server; sending, to each of the electronic devices in the trusted device set, a second message for requesting to obtain resource occupation information; receiving a third message sent by each of the electronic devices based on the second message, where the third message includes the resource occupation information; and determining the third electronic device from the electronic devices based on the received resource occupation information of each of the electronic devices.

With reference to the second aspect, in some implementations of the second aspect, when the instructions are executed by the device, the device is enabled to specifically perform the following steps: receiving a second verification list sent by the cloud server, where the second verification list includes verification information for performing verification on each piece of NFC tag information; and updating the first verification list based on the second verification list.

According to a third aspect, an embodiment of this application provides a computer storage medium, including computer instructions. When the computer instructions are run on an electronic device, the electronic device is enabled to perform the method according to any one of the first aspect or the possible implementations of the first aspect.

In embodiments of this application, when an application service is started by using NFC tag information, the application service is first started to run after local verification succeeds, and then cloud verification is performed. In this way, starting of the application service can be accelerated. In addition, local and cloud collaborative verification can ensure accuracy of a verification result.

DESCRIPTION OF EMBODIMENTS

The following describes technical solutions of this application with reference to the accompanying drawings.

As described in the background, in a scenario in which an application is started by touching an NFC tag of a device, NFC tag information may expire or be tampered with. Consequently, an application is started by mistake. Therefore, embodiments of this application provide an NFC tag verification method. In the method in embodiments of this application, after NFC tag information is obtained, verification may be performed on the NFC tag information based on a verification list. If the NFC tag information succeeds in the verification, an application is started, to avoid that the application is started by mistake as much as possible. The following describes in detail the NFC tag verification method in embodiments of this application with reference to the accompanying drawings.

Figure 1:
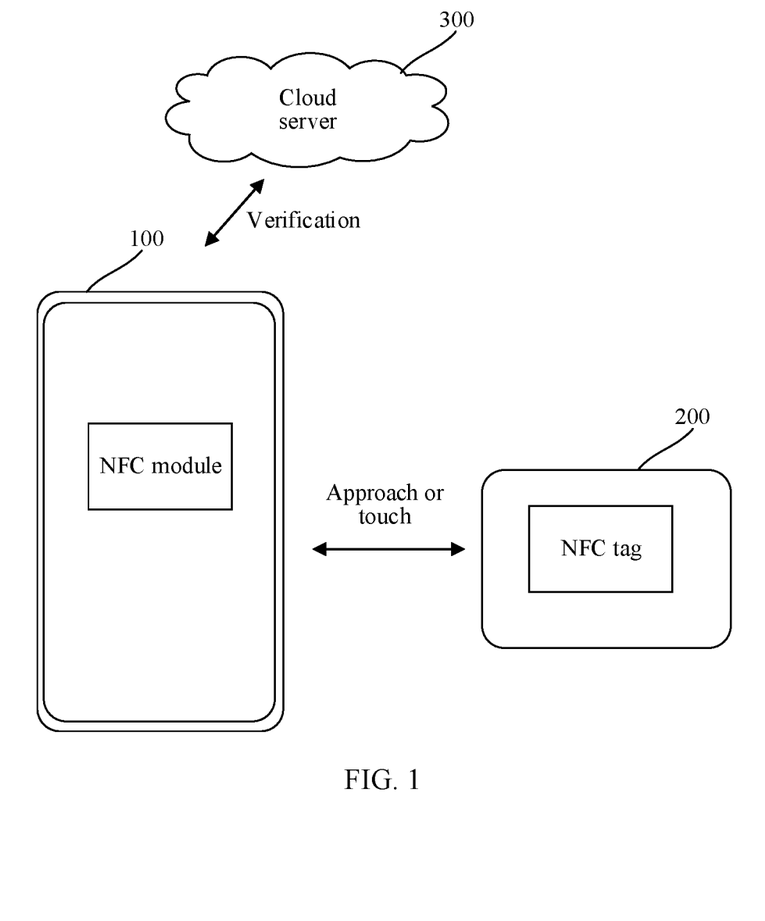
FIG. 1 is a schematic diagram of a near field communication scenario according to an embodiment of this application.

FIG. 1 is a schematic diagram of a near field communication scenario according to an embodiment of this application. As shown in FIG. 1, in the communication scenario, a first electronic device 100, a second electronic device 200, and a cloud server 300 are included. The first electronic device 100 or the second electronic device 200 may be an electronic device such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the electronic device is not limited in embodiments of this application.

In this embodiment of this application, the first electronic device 100 includes an NFC module. The second electronic device 200 includes an NFC tag. The NFC module in the first electronic device 100 may serve as a card reader to read NFC tag information stored in the NFC tag. In some embodiments, the NFC tag information may include one or a combination of the following information: a tag identifier, a device identifier, address information, an application service identifier, or the like. The tag identifier may identify the NFC tag. The device identifier may identify the second electronic device 200. Optionally, the device identifier may alternatively be a device identifier of a device associated with the second electronic device 200. After obtaining the device identifier of the device associated with the second electronic device 200, the first electronic device 100 may interact with the associated device based on the device identifier. In some embodiments, the address information may indicate an access address of the second electronic device 200. Optionally, the address information may alternatively be address information of a device associated with the second electronic device 200. The first electronic device 100 may interact with the corresponding associated device based on the address information of the device associated with the second electronic device 200. Optionally, the address information may be a Bluetooth address. The first electronic device 100 may perform Bluetooth communication with the second electronic device 200 or the associated device of the second electronic device 200 based on the Bluetooth address. In some embodiments, the application service identifier may identify an application service that can be started. In some embodiments, the application service identifier may be, for example, an identifier of service such as a printing service, a projection service, or a networking service. After obtaining the application service identifier, the first electronic device 100 may start a corresponding application, to implement linkage with the second electronic device 200 or a corresponding associated device. Certainly, the NFC tag information may further include other possible information based on an actual requirement. Details are not listed herein one by one.

Figure 2:
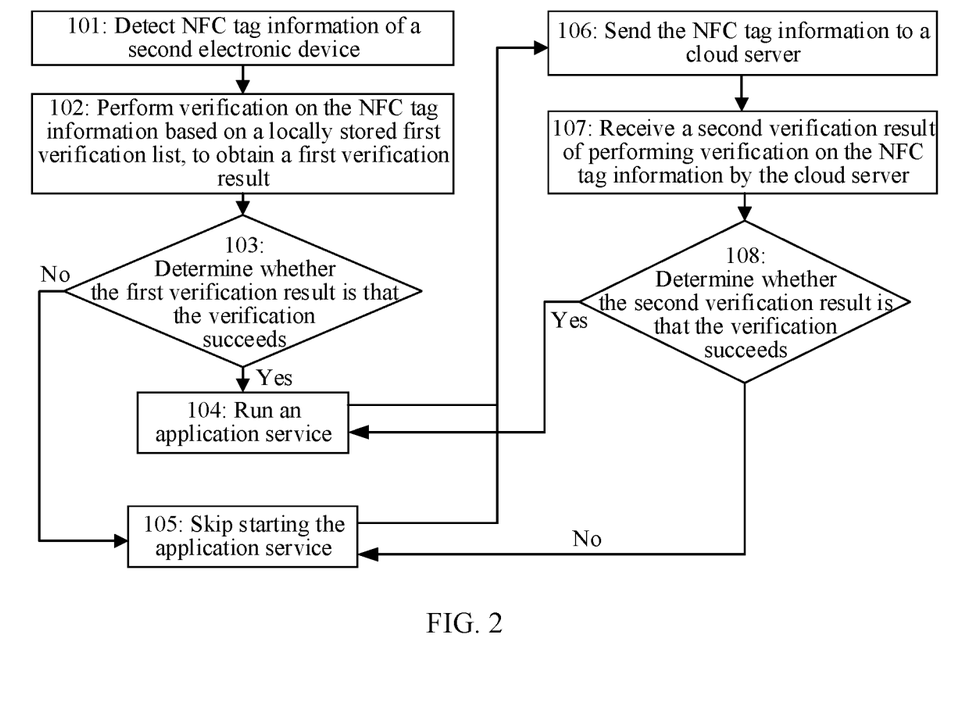
FIG. 2 is a flowchart of an NFC tag verification method according to an embodiment of this application.

In this embodiment of this application, the first electronic device 100 approaches or touches the NFC tag of the second electronic device 200. The NFC module in the first electronic device 100 reads the NFC tag information stored in the NFC tag. After obtaining the NFC tag information, the first electronic device 100 may perform verification on the NFC tag information based on a locally stored first verification list. In addition, on the basis of performing verification on the NFC tag information, the first electronic device 100 may perform cloud verification on the NFC tag information in combination with the cloud server 300. As shown in FIG. 2, an NFC tag verification method includes the following steps:

101: Detect NFC tag information of a second electronic device. In this embodiment of this application, a first electronic device may approach or touch an NFC tag of the second electronic device, to read the NFC tag information stored in the NFC tag.

102: Perform verification on the NFC tag information based on a locally stored first verification list, to obtain a first verification result.

In this embodiment of this application, the first electronic device stores the first verification list. The first electronic device performs verification on the obtained NFC tag information based on the first verification list. Optionally, the first verification list includes verification information for performing verification on the NFC tag information. The first electronic device performs verification on the NFC tag information based on the verification information in the first verification list, to obtain the first verification result.

103: Determine whether the first verification result is that the verification succeeds. If the first verification result is that the verification succeeds, step 104 is performed. If the first verification result is that the verification fails, step 105 is performed.

104: Run an application service. When determining, based on the first verification result, that the NFC tag information succeeds in the verification, the first electronic device starts the application service associated with the NFC information. After starting, based on the first verification result, the application service associated with the NFC tag information, the first electronic device further sends the NFC tag information to a cloud server. The first electronic device performs verification on the NFC tag information again via the cloud server, that is, goes to step 106.

105: Skip starting the application service. When determining, based on the first verification result, that the NFC tag information fails in the verification, the first electronic device refuses to start the application service associated with the NFC information. After refusing, based on the first verification result, to start an application server associated with the NFC tag information, the first electronic device sends the NFC tag information to the cloud server. The first electronic device performs verification on the NFC tag information again via the cloud server, that is, goes to step 106.

106: Send the NFC tag information to the cloud server. In the foregoing step 104, the first electronic device sends the NFC tag information to the cloud server regardless of whether the first verification result is that the verification succeeds or the verification fails. The cloud server performs verification on the NFC tag information based on a second verification list stored in a cloud, to obtain a second verification result. The cloud server sends the second verification result to the first electronic device.

107: Receive the second verification result of performing verification on the NFC tag information by the cloud server.

108: Determine whether the second verification result is that the verification succeeds. If the first verification result is that the verification succeeds, and the second verification result is that the verification succeeds, the first electronic device continues to run the application service associated with the NFC tag information. If the first verification result is that the verification succeeds, and the second verification result is that the verification fails, the first electronic device stops running the application service associated with the NFC tag information. If the first verification result is that the verification fails, and the second verification result is that the verification succeeds, the first electronic device starts to run the application service associated with the NFC tag information.

In this embodiment of this application, local verification is first performed on the NFC tag information. If the local verification succeeds, the application service is started to run. Then, the NFC tag information is further sent to the cloud server for cloud verification. If a result of the cloud verification is that the verification succeeds, the application service continues to run. If a result of the cloud verification is that the verification fails, the application service stops running. In this embodiment of this application, the application service is first started to run after the local verification succeeds, and then cloud verification is performed. In this way, starting of the application service can be accelerated. In addition, local and cloud collaborative verification can ensure accuracy of a verification result.

In this embodiment of this application, if the verification result of performing verification on the NFC tag information by the cloud server is inconsistent with the local verification result, the first electronic device further obtains the second verification list from the cloud server. The second verification list includes verification information for performing verification on each piece of NFC tag information. The first electronic device, updates the locally stored first verification list based on the second verification list.

In some embodiments, the second verification list stored in the cloud server is periodically updated. Optionally, each time after updating the second verification list, the cloud server sends updated verification information or an updated second verification list to the first electronic device. The first electronic device, updates the first verification list based on the verification information or the second verification list sent by the cloud device.

In some embodiments, the first electronic device periodically sends query information to the cloud server. The query information is for querying whether the second verification list in the cloud server is updated. When determining that the second verification list is updated, the cloud server sends the updated verification information or the updated second verification list to the first electronic device.

In this embodiment of this application, the first verification list in the first electronic device is updated, so that a verification list of the first electronic device can be synchronized with a verification list in the cloud. Further, accuracy of performing verification on the NFC tag information can be ensured.

Figure 3:
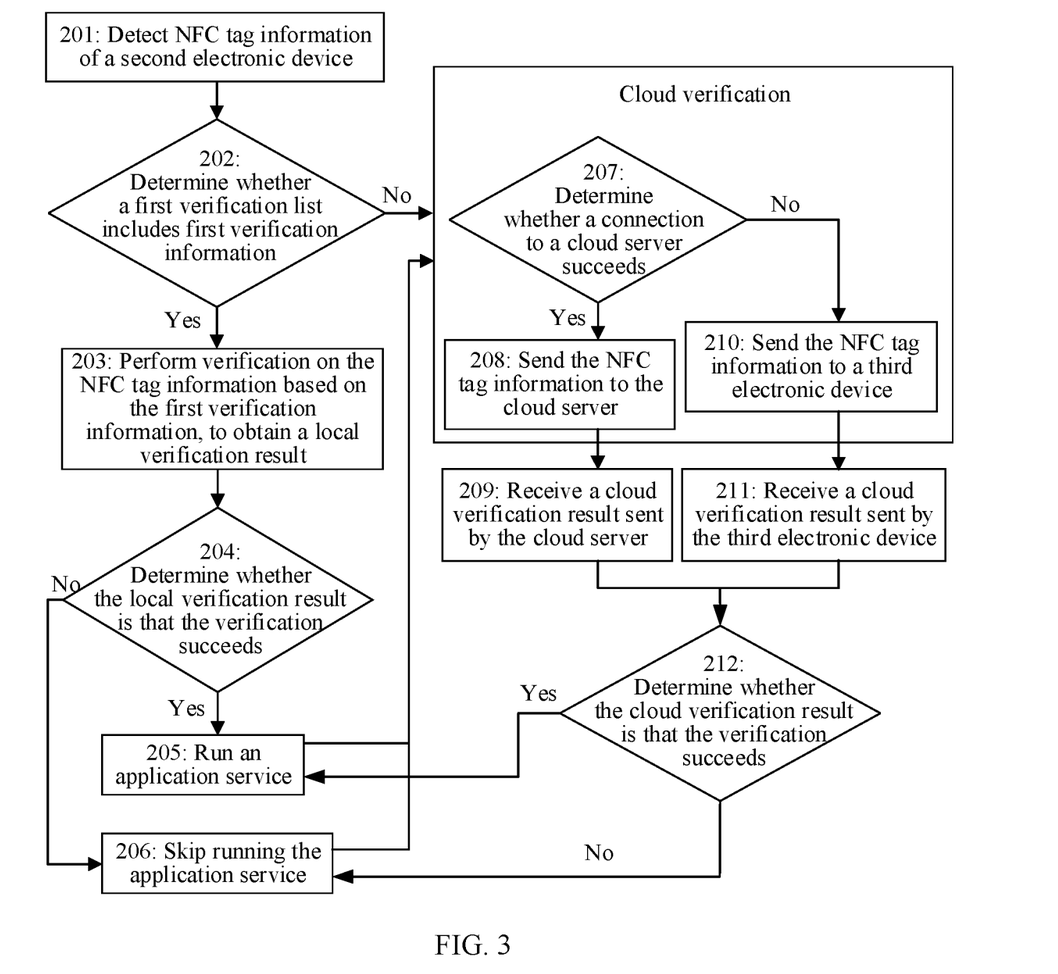
FIG. 3 is a flowchart of another NFC tag verification method according to an embodiment of this application.

FIG. 3 is a flowchart of another NFC tag verification method according to an embodiment of this application. As shown in FIG. 3, the method includes the following processing steps:

201: Detect NFC tag information of a second electronic device. In this embodiment of this application, a first electronic device may approach or touch an NFC tag of the second electronic device, to read the NFC tag information stored in the NFC tag.

202: Determine whether a first verification list includes first verification information. In this embodiment of this application, the first electronic device locally stores the first verification list. The first verification list includes verification information of a plurality of NFC tags. The first electronic device determines whether the first verification list includes the first verification information. The first verification information is information for performing verification on the NFC tag information of the second electronic device. If the first verification list includes the first verification information, step 203 is performed, to be specific, verification is performed on the NFC tag information based on the local first verification list of the first electronic device. If the first verification list does not include the first verification information, cloud verification is performed via a cloud server. A process of performing cloud verification via the cloud server is described in the following steps.

203: Perform verification on the NFC tag information based on the first verification information, to obtain a local verification result. In some embodiments, the first verification information includes a validity condition of an electronic tag. If the NFC tag information meets the validity condition, the NFC tag information succeeds in the verification. If the NFC tag information does not meet the validity condition, the NFC tag information fails in the verification. In some embodiments, the validity condition of the electronic tag may be a validity period. If a current time point for obtaining the NFC tag is within the validity period, it may be determined that the NFC tag information succeeds in the verification. If a current time point for obtaining the NFC tag is not within the validity period, it may be determined that the NFC tag information fails in the verification. In some embodiments, the validity condition of the electronic tag may be, for example, device type information that allows access to the NFC tag information. If a device type of the first electronic device is a type that allows access to the NFC tag, it may be determined that the NFC tag information succeeds in the verification. If a device type of the first electronic device is not a type that allows access to the NFC tag, it may be determined that the NFC tag information fails in the verification. Certainly, the validity condition of the electronic tag may alternatively be limited based on an actual scenario. Details are not listed herein one by one.

204: Determine whether the local verification result is that the verification succeeds. If the local verification result is that the verification succeeds, step 205 is performed. If the local verification result is that the verification fails, step 206 is performed.

205: Run an application service. When determining, based on the local verification result, that the NFC tag information succeeds in the verification, the first electronic device starts the application service associated with the NFC information. After starting, based on the local verification result, the application service associated with the NFC tag information, the first electronic device further performs cloud verification on the NFC tag information via the cloud server.

206: Skip running the application service. When determining, based on the first verification result, that the NFC tag information fails in the verification, the first electronic device refuses to start the application service associated with the NFC information. After refusing, based on the first verification result, to start an application server associated with the NFC tag information, the first electronic device further performs cloud verification on the NFC tag information via the cloud server.

As shown in FIG. 3, a process in which the first electronic device sends the NFC tag information to the cloud server for cloud verification includes:

207: Determine whether a connection to the cloud server succeeds. To be specific, the first electronic device determines whether the connection to the cloud server can be established. If the first electronic device can establish the connection to the cloud server, step 208 is performed. If the first electronic device fails to connect to the cloud server, step 210 is performed, to be specific, cloud verification is performed with assistance of another electronic device.

208: Send the NFC tag information to the cloud server.

209: Receive a cloud verification result sent by the cloud server, and then perform step 212.

210: Send the NFC tag information to a third electronic device. When determining that the first electronic device cannot connect to the cloud server, the first electronic device may send the NFC tag information to the cloud server via another electronic device (for example, the third electronic device). The third electronic device is an electronic device that establishes a connection to the cloud server. The third electronic device receives the cloud verification result of performing verification on the NFC tag information by the cloud server. The third electronic device sends the cloud verification result to the first electronic device. In some embodiments, the first electronic device sends a first message to the third electronic device in a near field communication manner. The first message includes the NFC tag information. Optionally, the near field communication manner may be an NFC communication manner, a Bluetooth communication manner, or another possible near field communication manner. For example, the first electronic device sends the first message to the third electronic device in the Bluetooth manner. Optionally, after obtaining the second verification result from the cloud server, the third electronic device may also send the second verification result to the first electronic device in the near field communication manner.

In some embodiments, a manner in which the first electronic device determines the third electronic device may be: The first electronic device determines a trusted device set. The trusted device set includes a plurality of electronic devices that each establish a connection to the cloud server. A manner in which the first electronic device determines the trusted device set may include: The first electronic device logs in to a first account. The first electronic device uses another electronic device that logs in to the first account as the electronic device in the trusted device set. Optionally, the first electronic device performs identity authentication with the another electronic device. The first electronic device uses an electronic device on which the identity authentication succeeds as a trusted device.

The first electronic device sends, to each of the electronic devices in the trusted device set, a second message for requesting to obtain resource occupation information. After receiving the second message, each of the electronic devices sends a third message to the first electronic device. The third message includes the resource occupation information. The resource occupation information is for reflecting a resource occupation status of the electronic device. The first electronic device determines, based on the resource occupation information of each of the electronic devices, the third electronic device from the electronic devices. Optionally, the first electronic device may select, from the electronic devices, a device that is in a networked state and has a low resource occupation rate as the third electronic device.

211: Receive the cloud verification result sent by the third electronic device, and then perform step 212.

212: Determine whether the cloud verification result is that the verification succeeds. When the cloud verification result is that the verification succeeds, and the local verification result is also that the verification succeeds, the first electronic device continues to run the application service associated with the NFC tag information. When the cloud verification result is that the verification succeeds, and the local verification result is that the verification fails, the first electronic device starts to run the application service associated with the NFC tag information. When the cloud verification result is that the verification fails, and the local verification result is that the verification succeeds, the first electronic device stops running the started application service. If both the cloud verification result and the local verification result are that the verification fails, the application service associated with the NFC tag information skips to be run. To be specific, after first starting or skipping starting the application service based on the local verification result, the first electronic device further determines, based on the cloud verification result, whether to continue to run the application service.

In some embodiments, the first verification list stored by the first electronic device may not be a latest list. After verification is performed on the obtained NFC tag information based on the first verification list, the obtained local verification result may be inaccurate. Therefore, in addition to starting or refusing to start the application service based on the local verification result, the first electronic device further sends the NFC tag information to the cloud server. The cloud server performs verification on the received NFC tag information based on a second verification list, to obtain the cloud verification result. The cloud server sends the cloud verification result to the first electronic device. The first electronic device determines whether the cloud verification result is the same as the local verification result. If the cloud verification result is different from the local verification result, the first electronic device changes a running status of the application service.

In this embodiment of this application, the first electronic device, performs verification on the NFC tag information based on the locally stored first verification list. After the local verification succeeds, the first electronic device first starts the application service, and then performs cloud verification. In this way, a start process of the application service can be accelerated. In addition, local and cloud collaborative verification can ensure accuracy of a verification result. In this embodiment of this application, when the first electronic device is in a disconnected state, cloud verification is performed with assistance of a peripheral device. Further, if the cloud verification result is different from the local verification result, the first electronic device may further obtain the second verification list from the cloud server, and update the locally stored first verification list based on the second verification list.

Figure 4:
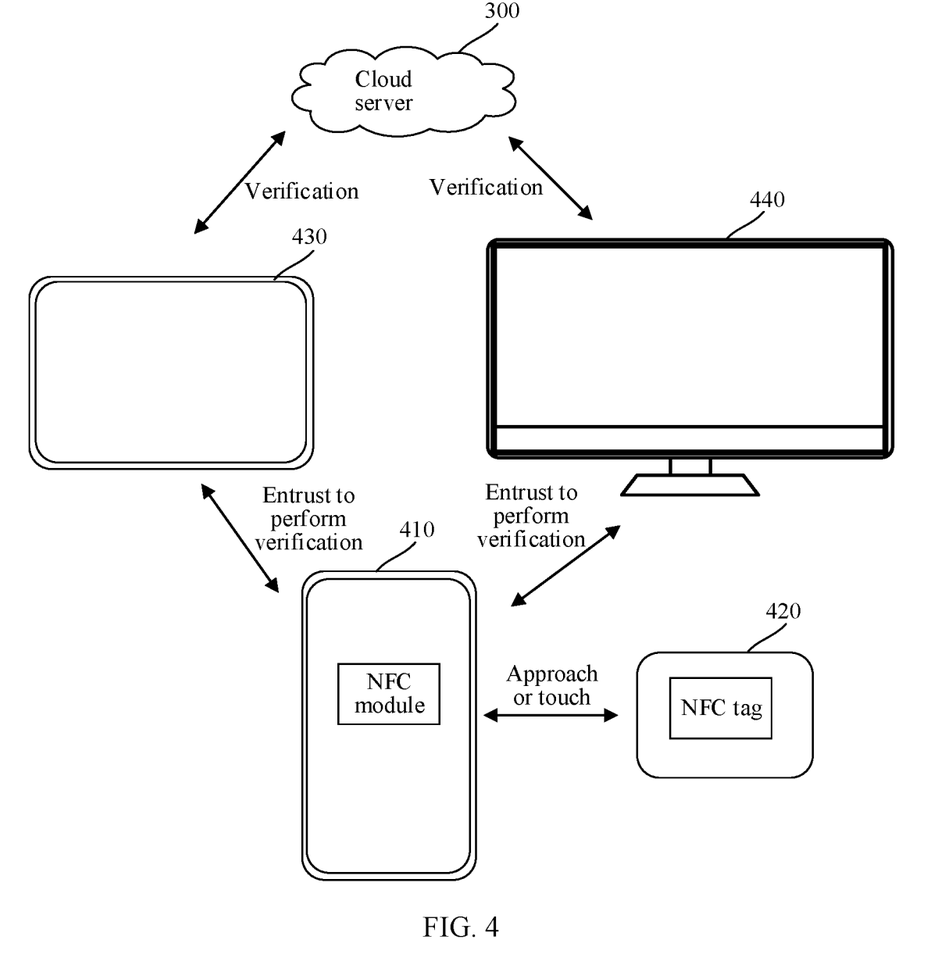
FIG. 4 is a schematic diagram of another near field communication scenario according to an embodiment of this application.

FIG. 4 is a schematic diagram of another near field communication scenario according to an embodiment of this application. As shown in FIG. 4, the communication scenario includes: a mobile phone 410, a television 440, a television remote control 420, a tablet computer 430, and a cloud server 300. The mobile phone 410 is provided with an NFC module. The television remote control 420 is provided with an NFC tag. In the scenario, after the mobile phone 410 touches the NFC tag of the television remote control 420, a process of performing verification on NFC tag information performed by the mobile phone 410 includes the following steps:

(1) The mobile phone 410 detects NFC tag information of the television remote control 420.

In some embodiments, the NFC tag information may include a Bluetooth address of the television 440. Optionally, the NFC tag information may further include an identifier of the NFC tag.

(2) The mobile phone 410 performs verification on the NFC tag information.

The mobile phone 410 stores a first verification list. As shown in Table 1, the first verification list includes a plurality of pieces of verification information. As shown in Table 1, each line indicates a piece of verification information. Each piece of verification information may include a tag identifier, application service information associated with the tag identifier, and a validity period.

TABLE 1

| Tag identifier | Application service information | Validity period |
| --- | --- | --- |
| Tag 1 | Application service 1 | 2018 Jan. 1-2025 Jan. 1 |
| Tag 2 | Application service 2 | 2017 Jan. 1-2021 Jan. 1 |
| Tag 3 | Application service 3 | 2017 Jan. 1-2018 Jan. 1 |
| Tag 4 | Application service 4 | 2016 Jan. 1-2017 Jan. 1 |

As shown in Table 1, the NFC tag 1 is associated with the application service 1; and the validity period is: 2018.01.01-2025.01.01.

The NFC tag 2 is associated with the application service 2; and the validity period is: 2017.01.01-2021.01.01.

The NFC tag 3 is associated with the application service 3; and the validity period is: 2017.01.01-2018.01.01.

The NFC tag 4 is associated with the application service 4; and the validity period is: 2016.01.01-2017.01.01.

The mobile phone 410 performs verification on the NFC tag information based on the first verification list. Optionally, the mobile phone 410 matches first verification information from the first verification list based on the NFC tag information. For example, the tag identifier included in the NFC tag information is the tag 2. In this case, the mobile phone 410 performs verification on the NFC tag information based on the verification information corresponding to the tag 2. In an example shown in Table 1, the validity period corresponding to the tag 2 is: 2017.01.01-2021.01.01. The mobile phone 410 may determine that the currently obtained tag information is within the validity period, and the NFC tag information succeeds in the verification.

(3) The mobile phone 410 starts an application service associated with the tag information. In an example shown in Table 1, the tag 2 is associated with the application service 2, and the mobile phone 410 starts the application service 2. In an example, the application service 2 is a projection service. In this case, after establishing a projection connection to the television 440, the mobile phone 410 performs projection to the television 440. Optionally, the NFC tag information obtained by the mobile phone 410 may include address information for establishing the projection connection to the television 440. The mobile phone 410 establishes the projection connection to the television 440 through the address information. In some embodiments, the application service 2 may be an analog remote control service. In this case, after determining that the NFC tag information succeeds, the mobile phone 410 may display an analog remote control interface on the mobile phone 410. In other words, the mobile phone 410 implements a function of a remote control, and controls the television 440.

(4) The mobile phone 410 sends the NFC tag information to the cloud server 300. After the mobile phone 410 successfully performs verification on the NFC tag information locally, the mobile phone 410 sends the NFC tag information to the cloud server 300. The cloud server 300 performs verification on the NFC tag information based on a second verification list. In some embodiments, if the cloud server 300 fails in the verification on the NFC tag, the cloud server 300 sends a verification failure result to the mobile phone 410.

(5) The mobile phone 410 stops running the application service associated with the tag information. In this embodiment of this application, when the mobile phone 410 successfully performs verification on the NFC tag information, and the cloud server 300 fails in the verification on the NFC tag information, the mobile phone 410 stops running the application service associated with the tag information. If the mobile phone 410 successfully performs verification on the NFC tag information, and the cloud server 300 also successfully performs verification on the NFC tag information, the mobile phone 410 continues to run the application service associated with the NFC tag information. In some embodiments, if the mobile phone 410 fails in the verification on the NFC tag information, the mobile phone 410 also sends the NFC tag information to the cloud server 300 for cloud verification. If the cloud server 300 also fails in the verification on the NFC tag information, the mobile phone 410 refuses to run the application service associated with the NFC tag information. If the cloud server 300 successfully performs verification on the NFC tag information, the mobile phone 410 starts the application service associated with the NFC tag information.

In some embodiments, that the mobile phone 410 sends the NFC tag information to the cloud server 300 may be: When the mobile phone 410 successfully connects to the cloud server 300, the mobile phone 410 sends NFC verification information to the cloud server 300. In some embodiments, when the mobile phone 410 fails to connect to the cloud server 300, the mobile phone 410 may perform cloud verification with assistance of another device. Optionally, the mobile phone 410 obtains a device logging in to a first account. The first account number is an account used by the mobile phone 410 to log in. In an example, the tablet computer 430 is a device having a same account as the mobile phone 410. In this case, the mobile phone 410 sends an assistance verification message to the tablet computer 430 in a short-distance wireless communication manner, for example, Bluetooth or Zigbee. The assistance verification message includes the NFC tag information. The tablet computer 430 sends the NFC tag information to the cloud server 300. After performing verification on the NFC tag information, the cloud server 300 sends a verification result to the tablet computer 430. The tablet computer 430 sends the verification result to the mobile phone 410. The mobile phone 410 determines, based on the verification result, whether to start the application associated with the NFC tag information. If the verification result sent by the tablet computer 430 to the mobile phone 410 is that the verification fails, the mobile phone 410 stops running the application service associated with the NFC tag information.

In some embodiments, there are a plurality of same-account devices determined by the mobile phone 410. As shown in FIG. 4, the same-account devices of the mobile phone 410 include the tablet computer 430 and the television 440. In this case, the mobile phone 410 determines one target device from the plurality of devices. The mobile phone 410 sends the NFC tag information to the cloud server 300 with assistance of the target device. Optionally, the mobile phone 410 may store a same-account device list. The mobile phone 410 determines some or all electronic devices included in the same-account device list as candidate electronic devices. The mobile phone 410 sends the assistance verification message to the candidate electronic devices. After receiving the assistance verification message, the candidate electronic devices send resource occupation information to the mobile phone 410. The resource occupation information may include a network connection status, a resource occupation status, or the like. The mobile phone 410 determines the target device from the candidate electronic devices based on the resource occupation information. The network connection status indicates whether an electronic device can be connected to the cloud server 300. The resource occupation status may include a central processing unit (CPU) utilization rate, an input/output (I/O) utilization rate, a bandwidth utilization rate, or the like. Optionally, the mobile phone 410 may determine one electronic device that is in a networked state and that occupies a small amount of resources as the target device. As shown in FIG. 4, the mobile phone 410 may use the tablet computer 430 as the target device. The mobile phone 410 sends the NFC verification information to the cloud server 300 via the tablet computer 430.

In this embodiment of this application, local and cloud collaborative verification is performed on the NFC tag information, and the application service is first started when the local verification succeeds. This can resolve a delay problem caused by the cloud verification while ensuring accuracy of the verification result. In addition, in an offline scenario, the electronic device may entrust a peripheral trusted device to assist in verification, to implement offline verification of the NFC tag information.

An embodiment of this application further provides an electronic device. The electronic device may be a terminal device, or may be a circuit device built in the terminal device. The device may be configured to perform functions/steps in the foregoing method embodiments.

Figure 5:
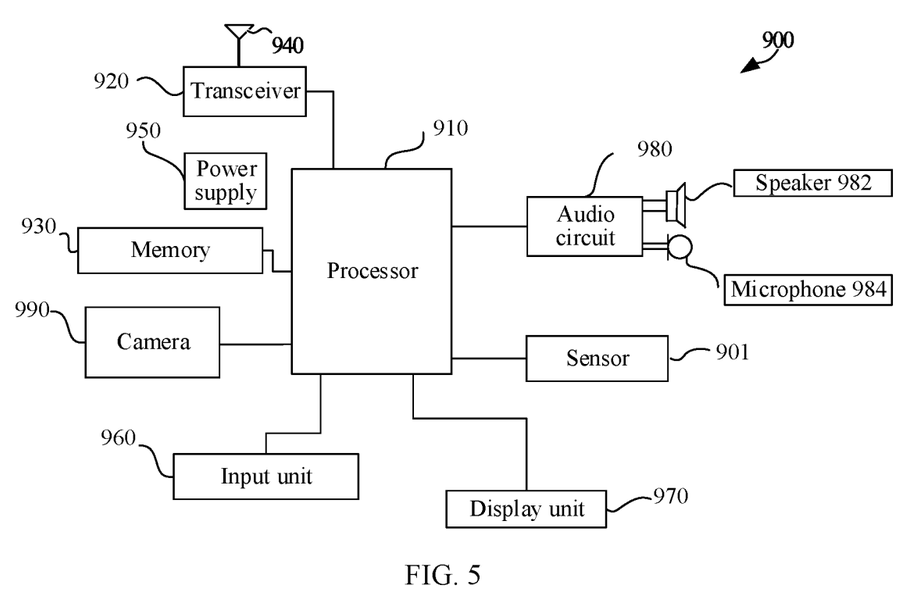
FIG. 5 is a schematic diagram of a structure of an electronic device according to an embodiment of this application.

As shown in FIG. 5, an electronic device 900 includes a processor 910 and a transceiver 920. Optionally, the electronic device 900 may further include a memory 930. The processor 910, the transceiver 920, and the memory 930 may communicate with each other through an internal connection path, to transmit a control signal and/or a data signal. The memory 930 is configured to store a computer program, and the processor 910 is configured to invoke and run the computer program from the memory 930.

Optionally, the electronic device 900 may further include an antenna 940, configured to send a wireless signal output by the transceiver 920. In this embodiment of this application, the transceiver 920 may implement a mobile communication function and/or a wireless communication function. Optionally, the transceiver 920 includes an NFC module, configured to read NFC tag information of another electronic device. Optionally, the transceiver 920 includes a Bluetooth module and a wireless fidelity (Wi-Fi) module that are respectively configured to implement a Bluetooth communication function and a Wi-Fi network access function.

The processor 910 and the memory 930 may be integrated into one processing apparatus, or more commonly, may be components that are independent of each other. The processor 910 is configured to execute program code stored in the memory 930, to implement the foregoing functions. During specific implementation, the memory 930 may alternatively be integrated into the processor 910, or may be independent of the processor 910.

In addition, to improve functions of the electronic device 900, the electronic device 900 may further include one or more of an input unit 960, a display unit 970, an audio circuit 980, a camera 990, a sensor 901, or the like. The audio circuit may further include a speaker 982, a microphone 984, or the like. The display unit 970 may include a display screen.

Optionally, the electronic device 900 may further include a power supply 950, configured to supply power to various components or circuits in the terminal device.

It should be understood that the electronic device 900 shown in FIG. 5 may be used as a first electronic device to implement processes in the method embodiments shown in FIG. 2 to FIG. 3. Operations and/or functions of the modules of the electronic device 900 are separately intended to implement corresponding processes in the foregoing method embodiments. For details, refer to descriptions in the foregoing method embodiments. To avoid repetition, detailed descriptions are properly omitted herein.

It should be understood that the processor 910 in the electronic device 900 shown in FIG. 5 may be a system-on-a-chip (SOC). The processor 910 may include a central processing unit (CPU), and may further include another type of processor. The CPU may be referred to as a host CPU. A neural network processing unit NPU is mounted to the host CPU as a coprocessor, and the host CPU assigns a task. The processors work together to implement the foregoing method procedures, and each processor may selectively execute a part of a software driver.

This application further provides a computer-readable storage medium. The computer-readable storage medium stores instructions. When the instructions are run on a computer, the computer is enabled to perform the steps in the method shown in FIG. 2 or FIG. 3.

This application further provides a computer program product including instructions. When the computer program product runs on a computer or at least one processor, the computer is enabled to perform the steps in the method shown in FIG. 2 or FIG. 3.

This application further provides a chip including a processor. The processor is configured to read and run a computer program stored in a memory, to perform corresponding operations and/or procedures performed in the methods provided in this application.

Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that need to be processed. The processor obtains the data and/or the information from the communication interface, and processes the data and/or the information. The communication interface may be an input/output interface.

In the foregoing embodiments, the processor 910 may include, for example, a central processing unit (CPU), a microprocessor, a microcontroller, or a digital signal processor, and may further include a GPU, an NPU, and an ISP. The processor may further include a necessary hardware accelerator or a logic processing hardware circuit, for example, an application-specific integrated circuit (ASIC), or one or more integrated circuits configured to control program execution of the technical solutions of this application. In addition, the processor may have a function of operating one or more software programs, and the software programs may be stored in the memory.

The memory may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile optical disc, a Blu-ray disc, or the like), a magnetic disk storage medium or another magnetic storage device, any other medium that can carry or store expected program code in an instruction form or a data structure form that can be accessed by a computer, or the like.

A person of ordinary skill in the art may be aware that the units and algorithm steps described in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it is not considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

The foregoing descriptions are merely specific implementations of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An NFC tag verification method applied to a first electronic device, comprising:
   detecting NFC tag information of a second electronic device;
   performing verification on the NFC tag information based on a locally stored first verification list to obtain a first verification result;
   in response to the first verification result indicating that the verification succeeds, starting to run an application service associated with the NFC tag information;
   sending the NFC tag information to a cloud server;
   receiving a second verification result obtained by the cloud server by performing verification on the NFC tag information; and
   in response to the second verification result indicating that the verification fails, stopping running the application service.

2. The method according to claim 1, wherein the detecting of the NFC tag information of the second electronic device comprises:
   in response to an operation of approaching or touching an NFC tag of the second electronic device, reading the NFC tag information stored in the NFC tag.

3. The method according to claim 1, wherein the performing the verification on the NFC tag information based on a locally stored first verification list to obtain a first verification result comprises:
  determining, based on the NFC tag information, whether the first verification list comprises first verification information for performing verification on the NFC tag information; and
  in response to determining that the first verification list comprises the first verification information, performing verification on the NFC tag based on the first verification information to obtain the first verification result.

4. The method according to claim 3, further comprising:
  in response to determining that the first verification list does not comprise the first verification information, determining that the first verification result is that the verification fails.

5. The method according to claim 3, further comprising:
  in response to determining that the first verification list comprises the first verification information and the verification on the NFC tag information based on the first verification information failing, determining that the first verification result is that the verification fails.

6. The method according to claim 1, further comprising:
  in response to the first verification result indicating that the verification fails, skipping starting the application service associated with the NFC tag information; and
  in response to the NFC tag information being sent to the cloud server and the second verification result obtained from the cloud server indicating that the verification succeeds, starting the application service associated with the NFC tag information.

7. The method according to claim 1, wherein the sending the NFC tag information to a cloud server comprises:
  in response to determining that a connection to the cloud server fails, sending a first message to a third electronic device in a near field communication manner, wherein the first message comprises the NFC tag information, and wherein the third electronic device is a device that establishes a connection to the cloud server; and
  wherein the receiving of the second verification result of performing verification on the NFC tag information by the cloud server comprises receiving the second verification result sent by the third electronic device, wherein the third electronic device is configured to send the NFC tag information to the cloud server and obtain the second verification result from the cloud server.

8. The method according to claim 7, wherein before the sending of the first message to a third electronic device in a near field communication manner, the method further comprises:
  determining a trusted device set, wherein the trusted device set comprises a plurality of electronic devices that each establish a connection to the cloud server;
  sending, to each of the electronic devices in the trusted device set, a second message for requesting to obtain resource occupation information;
  receiving a third message sent by each of the electronic devices based on the second message, wherein the third message comprises the resource occupation information; and
  determining the third electronic device from the trusted device set based on the received resource occupation information of each of the electronic devices.

9. The method according to claim 1, further comprising:
  receiving a second verification list sent by the cloud server, wherein the second verification list comprises verification information for performing verification on each piece of NFC tag information; and
  updating the first verification list based on the second verification list.

10. An electronic device that serves as a first electronic device, comprising:
  one or more processors;
  a memory; and
  one or more computer programs, wherein the one or more computer programs are stored in the memory, and the one or more computer programs comprise instructions, and in response to the instructions being executed by the electronic device, the electronic device is enabled to perform the following:
  detecting NFC tag information of a second electronic device;
  performing verification on the NFC tag information based on a locally stored first verification list, to obtain a first verification result;
  in response to the first verification result indicating that the verification succeeds, starting to run an application service associated with the NFC tag information;
  sending the NFC tag information to a cloud server;
  receiving a second verification result obtained by the cloud server by performing verification on the NFC tag information; and
  in response to the second verification result indicating that the verification fails, stopping running the application service.

11. The electronic device according to claim 10, wherein in response to the instructions being executed by the electronic device, the electronic device is further enabled to perform the following:
  in response to an operation of approaching or touching an NFC tag of the second electronic device, reading the NFC tag information stored in the NFC tag.

12. The electronic device according to claim 10, wherein in response to the instructions being executed by the electronic device, the electronic device is further enabled to perform the following:
  determining, based on the NFC tag information, whether the first verification list comprises first verification information for performing verification on the NFC tag information; and
  in response to determining that the first verification list comprises the first verification information, performing verification on the NFC tag based on the first verification information to obtain the first verification result.

13. The electronic device according to claim 12, wherein in response to the instructions being executed by the electronic device, the electronic device is further enabled to perform the following:
  in response to determining that the first verification list does not comprise the first verification information, determining that the first verification result is that the verification fails.

14. The electronic device according to claim 12, wherein in response to the instructions being executed by the electronic device, the electronic device is further enabled to perform the following:
  in response to determining that the first verification list comprises the first verification information and the verification on the NFC tag information based on the first verification information fails, determining that the first verification result is that the verification fails.

15. The electronic device according to claim 10, wherein in response to the instructions being executed by the electronic device, the electronic device is further enabled to perform the following:
- in response to the first verification result indicating that the verification fails, skipping starting the application service associated with the NFC tag information; and
- in response to the NFC tag information being sent to the cloud server and the second verification result obtained from the cloud server indicating that the verification succeeds, starting the application service associated with the NFC tag information.

16. The electronic device according to claim 10, wherein;
- in response to determining that a connection to the cloud server fails, a first message is sent to a third electronic device in a near field communication manner, wherein the first message comprises the NFC tag information, and wherein the third electronic device is a device that establishes a connection to the cloud server; and
- the second verification result sent by the third electronic device is received, wherein the third electronic device is configured to send the NFC tag information to the cloud server and obtain the second verification result from the cloud server.

17. The electronic device according to claim 16, wherein in response to the instructions being executed by the electronic device, the electronic device is further enabled to perform the following:
- determining a trusted device set, wherein the trusted device set comprises a plurality of electronic devices that each establish a connection to the cloud server;
- sending, to each of the electronic devices in the trusted device set, a second message for requesting to obtain resource occupation information;
- receiving a third message sent by each of the electronic devices based on the second message, wherein the third message comprises the resource occupation information; and
- determining the third electronic device from the trusted device set based on the received resource occupation information of each of the electronic devices.

18. The electronic device according to claim 10, wherein in response to the instructions being executed by the electronic device, the electronic device is further enabled to perform the following:
- receiving a second verification list sent by the cloud server, wherein the second verification list comprises verification information for performing verification on each piece of NFC tag information; and
- updating the first verification list based on the second verification list.

19. A non-transitory computer storage medium, comprising computer instructions that when run on an electronic device cause the electronic device to perform the following:
- detecting NFC tag information of a second electronic device;
- performing verification on the NFC tag information based on a locally stored first verification list to obtain a first verification result;
- in response to the first verification result indicating that the verification succeeds, starting to run an application service associated with the NFC tag information;
- sending the NFC tag information to a cloud server;
- receiving a second verification result obtained by the cloud server by performing verification on the NFC tag information; and
- in response to the second verification result indicating that the verification fails, stopping running the application service.

20. The non-transitory computer storage medium according to claim 19, wherein when the computer instructions are run on the electronic device further cause the electronic device to perform the following:
- determining, based on the NFC tag information, whether the first verification list comprises first verification information for performing verification on the NFC tag information; and
- in response to the first verification list comprising the first verification information and based on the first verification information, performing verification on the NFC tag to obtain the first verification result.

* * * * *

UNITED STATES PATENT AND TRADEMARK OFFICE
CERTIFICATE OF CORRECTION

| | | |
|---|---|---|
| PATENT NO. | : 12,348,970 B2 | Page 1 of 1 |
| APPLICATION NO. | : 18/255053 | |
| DATED | : July 1, 2025 | |
| INVENTOR(S) | : Yang et al. | |

It is certified that error appears in the above-identified patent and that said Letters Patent is hereby corrected as shown below:

In the Claims

Claim 16: Column 19, Line 13: "The electronic device according to claim 10, wherein;" should read as -- The electronic device according to claim 10, wherein: --.

Signed and Sealed this
Tenth Day of February, 2026

John A. Squires
*Director of the United States Patent and Trademark Office*